(12) United States Patent
Linsky

(10) Patent No.: US 8,903,314 B2
(45) Date of Patent: Dec. 2, 2014

(54) BLUETOOTH INTRODUCTION SEQUENCE THAT REPLACES FREQUENCIES UNUSABLE DUE TO OTHER WIRELESS TECHNOLOGY CO-RESIDENT ON A BLUETOOTH-CAPABLE DEVICE

(75) Inventor: Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 12/791,599

(22) Filed: Jun. 1, 2010

(65) Prior Publication Data

US 2011/0105027 A1    May 5, 2011

Related U.S. Application Data (60) Provisional application No. 61/256,198, filed on Oct. 29, 2009.

(51) Int. Cl.
| | |
|---|---|
| *H04B 7/00* | (2006.01) |
| *H04W 16/14* | (2009.01) |
| *H04B 1/715* | (2011.01) |
| *H04W 88/06* | (2009.01) |
| *H04W 72/08* | (2009.01) |

(52) U.S. Cl.
CPC ............... *H04B 1/715* (2013.01); *H04W 16/14* (2013.01); *H04W 88/06* (2013.01); *H04B 2001/7154* (2013.01); *H04W 72/082* (2013.01)
USPC ............ 455/41.2; 455/41.1; 455/75; 375/346

(58) Field of Classification Search
USPC .................. 455/41.1, 41.2, 75, 410; 375/346
See application file for complete search history.

(56) References Cited

U.S. PATENT DOCUMENTS

| | | |
|---|---|---|
| 5,486,210 A | 1/1996 | Kerr et al. |
| 6,128,483 A | 10/2000 | Doiron et al. |

(Continued)

FOREIGN PATENT DOCUMENTS

| | | |
|---|---|---|
| CN | 1666189 A | 9/2005 |
| CN | 1716900 A | 1/2006 |

(Continued)

OTHER PUBLICATIONS

Bluetooth SIG, Inc. "Bluetooth Specification Version 3.0+HS, Core System Package, Part B Baseband Specification", vol. 2 Apr. 21, 2009, pp. 68-85, XP002622397, Retrieved from the Internet: URL: http://www.bluetooth.com/Specification%20Documents/Core_V30_HS.zip.
International Search Report and Written Opinion—PCT/US2010/054466, International Search Authority—European Patent Office—Mar. 18, 2011.

(Continued)

*Primary Examiner* — Tuan H Nguyen
(74) *Attorney, Agent, or Firm* — Stanton Braden

(57) ABSTRACT

Interference from other wireless technology co-resident on a Bluetooth-capable device may render one or more Bluetooth frequencies unusable for a Bluetooth introduction sequence. In this case, one or more usable frequencies may be substituted for the one or more unusable frequencies to permit the introduction sequence to proceed. The one or more usable frequencies may be selected from a known set of usable frequencies in the current Bluetooth frequency train. Alternatively, a frequency re-mapping process may be used to select the one or more usable frequencies from the current Bluetooth frequency train.

24 Claims, 6 Drawing Sheets

(56) References Cited

U.S. PATENT DOCUMENTS

| | | |
|---|---|---|
| 6,944,430 B2 | 9/2005 | Berstis |
| 7,035,314 B1 | 4/2006 | Linsky |
| 7,317,900 B1 | 1/2008 | Linde et al. |
| 7,324,815 B2 | 1/2008 | Ross et al. |
| 7,339,446 B2 | 3/2008 | Su et al. |
| 7,412,250 B2 | 8/2008 | Fukuda |
| 7,433,970 B1 | 10/2008 | Euler et al. |
| 7,440,728 B2 | 10/2008 | Abhishek et al. |
| 7,454,171 B2 | 11/2008 | Palin et al. |
| 7,685,325 B2 | 3/2010 | Batchelor et al. |
| 7,786,755 B2 | 8/2010 | Yao et al. |
| 7,903,642 B2 | 3/2011 | Voutilainen et al. |
| 7,990,882 B1 | 8/2011 | Bedair et al. |
| 7,990,992 B2 | 8/2011 | Muukki et al. |
| 8,060,085 B2 | 11/2011 | Goulder et al. |
| 8,089,888 B2 | 1/2012 | Krishnamurthi et al. |
| 8,095,176 B2 | 1/2012 | Sudak |
| 8,184,154 B2 | 5/2012 | Estevez et al. |
| 2002/0080728 A1 | 6/2002 | Sugar et al. |
| 2002/0129184 A1 | 9/2002 | Watanabe |
| 2002/0167963 A1 | 11/2002 | Joa-Ng |
| 2003/0135675 A1 | 7/2003 | Pontius et al. |
| 2003/0231741 A1 | 12/2003 | Rancu et al. |
| 2004/0022210 A1 | 2/2004 | Frank et al. |
| 2004/0028003 A1 | 2/2004 | Diener et al. |
| 2004/0029619 A1 | 2/2004 | Liang et al. |
| 2004/0052272 A1 | 3/2004 | Frank |
| 2004/0192222 A1 | 9/2004 | Vaisanen et al. |
| 2004/0259589 A1 | 12/2004 | Bahl et al. |
| 2005/0047038 A1 | 3/2005 | Nakajima et al. |
| 2005/0099943 A1 | 5/2005 | Naghian et al. |
| 2005/0239497 A1 | 10/2005 | Bahl et al. |
| 2005/0277387 A1 | 12/2005 | Kojima et al. |
| 2005/0289092 A1 | 12/2005 | Sumner et al. |
| 2006/0013176 A1 | 1/2006 | De Vos et al. |
| 2006/0025181 A1 | 2/2006 | Kalofonos et al. |
| 2006/0026051 A1 | 2/2006 | Rose |
| 2006/0089119 A1 | 4/2006 | Lipasti et al. |
| 2006/0101033 A1 | 5/2006 | Hu et al. |
| 2006/0126702 A1 | 6/2006 | Burdett |
| 2006/0152335 A1 | 7/2006 | Helgeson |
| 2006/0166628 A1 | 7/2006 | Anttila |
| 2006/0233191 A1 | 10/2006 | Pirzada et al. |
| 2006/0292986 A1 | 12/2006 | Bitran et al. |
| 2007/0105548 A1 | 5/2007 | Mohan et al. |
| 2007/0124005 A1 | 5/2007 | Bourakov et al. |
| 2007/0135162 A1 | 6/2007 | Banerjea et al. |
| 2007/0153702 A1 | 7/2007 | Khan Alicherry et al. |
| 2007/0165754 A1* | 7/2007 | Kiukkonen et al. .......... 375/346 |
| 2007/0206631 A1 | 9/2007 | Parts et al. |
| 2007/0232349 A1 | 10/2007 | Jones et al. |
| 2007/0248114 A1 | 10/2007 | Jia et al. |
| 2007/0255850 A1 | 11/2007 | Gould et al. |
| 2007/0281617 A1 | 12/2007 | Meylan et al. |
| 2008/0019339 A1 | 1/2008 | Raju et al. |
| 2008/0045152 A1 | 2/2008 | Boes |
| 2008/0066019 A1 | 3/2008 | Worek et al. |
| 2008/0109581 A1 | 5/2008 | Pham et al. |
| 2008/0130580 A1 | 6/2008 | Chaponniere et al. |
| 2008/0161041 A1 | 7/2008 | Pernu |
| 2008/0192806 A1 | 8/2008 | Wyper et al. |
| 2008/0200120 A1 | 8/2008 | Ruuska et al. |
| 2008/0227456 A1 | 9/2008 | Huang et al. |
| 2008/0232339 A1 | 9/2008 | Yang et al. |
| 2008/0254745 A1 | 10/2008 | Zhang et al. |
| 2008/0279137 A1 | 11/2008 | Pernu et al. |
| 2008/0279155 A1 | 11/2008 | Pratt, Jr. et al. |
| 2008/0287158 A1 | 11/2008 | Rayzman et al. |
| 2008/0298643 A1 | 12/2008 | Lawther et al. |
| 2008/0311912 A1 | 12/2008 | Balasubramanian et al. |
| 2009/0033550 A1 | 2/2009 | Wolf |
| 2009/0040937 A1 | 2/2009 | Xhafa et al. |
| 2009/0061781 A1 | 3/2009 | Zhang |
| 2009/0116437 A1 | 5/2009 | Alexandre et al. |
| 2009/0116573 A1 | 5/2009 | Gaal et al. |
| 2009/0137206 A1 | 5/2009 | Sherman et al. |
| 2009/0176454 A1 | 7/2009 | Chen et al. |
| 2009/0180451 A1 | 7/2009 | Alpert et al. |
| 2009/0196210 A1 | 8/2009 | Desai |
| 2009/0215404 A1 | 8/2009 | Kesavan et al. |
| 2009/0239471 A1 | 9/2009 | Tran et al. |
| 2009/0252053 A1 | 10/2009 | Leith et al. |
| 2009/0252128 A1 | 10/2009 | Yang et al. |
| 2009/0257380 A1 | 10/2009 | Meier |
| 2009/0262785 A1 | 10/2009 | Wilhelmsson |
| 2009/0310501 A1 | 12/2009 | Catovic et al. |
| 2009/0323652 A1 | 12/2009 | Chen et al. |
| 2010/0085951 A1 | 4/2010 | Pernu et al. |
| 2010/0130129 A1 | 5/2010 | Chang et al. |
| 2010/0137025 A1 | 6/2010 | Tal et al. |
| 2010/0141399 A1 | 6/2010 | Swope |
| 2010/0142500 A1 | 6/2010 | Sudak |
| 2010/0153760 A1 | 6/2010 | Gupta et al. |
| 2010/0158037 A1 | 6/2010 | Heinke et al. |
| 2010/0197235 A1 | 8/2010 | Wilhelmsson |
| 2010/0203832 A1 | 8/2010 | Russell et al. |
| 2010/0241727 A1 | 9/2010 | Bourakov et al. |
| 2010/0273426 A1 | 10/2010 | Walley et al. |
| 2010/0304685 A1 | 12/2010 | Wietfeldt et al. |
| 2010/0304770 A1 | 12/2010 | Wietfeldt et al. |
| 2010/0311455 A1 | 12/2010 | Armstrong et al. |
| 2010/0316027 A1 | 12/2010 | Rick et al. |
| 2010/0322287 A1 | 12/2010 | Truong et al. |
| 2010/0329161 A1 | 12/2010 | Ylanen et al. |
| 2010/0329162 A1 | 12/2010 | Kadous et al. |
| 2010/0330977 A1 | 12/2010 | Kadous et al. |
| 2010/0331029 A1 | 12/2010 | Linsky et al. |
| 2011/0007680 A1 | 1/2011 | Kadous et al. |
| 2011/0007688 A1 | 1/2011 | Veeravalli et al. |
| 2011/0009136 A1 | 1/2011 | Mantravadi et al. |
| 2011/0026432 A1 | 2/2011 | Gruber et al. |
| 2011/0026458 A1 | 2/2011 | Gruber et al. |
| 2011/0065402 A1 | 3/2011 | Kraft et al. |
| 2011/0116490 A1 | 5/2011 | Wilhelmsson et al. |
| 2011/0199989 A1 | 8/2011 | Wietfeldt et al. |
| 2011/0249603 A1 | 10/2011 | Rick et al. |
| 2011/0317565 A1 | 12/2011 | Krishnamurthi et al. |
| 2012/0034870 A9 | 2/2012 | Desai et al. |
| 2012/0129457 A1 | 5/2012 | Linsky |
| 2012/0213303 A1 | 8/2012 | Kadous et al. |
| 2012/0230303 A1 | 9/2012 | Guo et al. |
| 2012/0270595 A1 | 10/2012 | Yang et al. |

FOREIGN PATENT DOCUMENTS

| | | |
|---|---|---|
| CN | 1741484 A | 3/2006 |
| CN | 1887018 A | 12/2006 |
| CN | 101262254 A | 9/2008 |
| CN | 101378355 A | 3/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1705936 | 9/2006 |
| EP | 1729464 A1 | 12/2006 |
| EP | 1959619 | 8/2008 |
| EP | 2068452 | 6/2009 |
| GB | 2412817 A | 10/2005 |
| JP | S61110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007129711 A | 5/2007 |

(56) References Cited

FOREIGN PATENT DOCUMENTS

| JP | 2007202176 A | 8/2007 |
|---|---|---|
| JP | 2007523519 A | 8/2007 |
| JP | 2008521309 A | 6/2008 |
| JP | 2008219444 A | 9/2008 |
| JP | 2009500988 A | 1/2009 |
| JP | 2009042887 A | 2/2009 |
| JP | 2009534972 A | 9/2009 |
| JP | 2010504677 A | 2/2010 |
| JP | 2010531565 A | 9/2010 |
| KR | 20060047429 A | 5/2006 |
| TW | 1264209 B | 10/2006 |
| TW | 200820800 A | 5/2008 |
| TW | 1309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | 2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

Coen Bron, et al., Algorithm 457: Finding All Cliques of an Undirected Graph, Communications of the ACM, 16(9): 575-577, 1973.

F. Cazals, C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1536-1284.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., "Interference-Aware Channel Assignment in Multi-Radio Wireless Mesh Networks", INFOCOM 2006, 25th IEEE International Conference on Computer Communications, Proceedings, IEEE Piscataway, NJ, Apr. 1, 2006, pp. 1-12, XP031072217, DOI: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

Taiwan Search Report—TW099122728—TIPO—May 20, 2013.
Taiwan Search Report—TW099137223—TIPO—Dec. 13, 2013.

* cited by examiner (PRIOR ART)
FIG. 1

| Step | Message | Packet Type | Direction | Hopping Sequence | Access Code and Clock |
|---|---|---|---|---|---|
| 1 | Page | ID | Master to slave | Page | Slave |
| 2 | First slave page response | ID | Slave to master | Page response | Slave |
| 3 | Master page response | FHS | Master to slave | Page | Slave |
| 4 | Second slave page response | ID | Slave to master | Page response | Slave |
| 5 | 1st packet master | POLL | Master to slave | Channel | Master |
| 6 | 1st packet slave | Any type | Slave to master | Channel | Master |

↓ TIME (PRIOR ART)
FIG. 2

BLUETOOTH INTRODUCTION SEQUENCE THAT REPLACES FREQUENCIES UNUSABLE DUE TO OTHER WIRELESS TECHNOLOGY CO-RESIDENT ON A BLUETOOTH-CAPABLE DEVICE

CLAIM OF PRIORITY UNDER 35 U.S.C. §119

The present application for patent claims priority to Provisional Application No. 61/256,198 filed Oct. 29, 2009, assigned to the assignee hereof and hereby expressly incorporated by reference herein.

BACKGROUND

1. Field

The present work relates generally to wireless communication and, more particularly, to avoiding frequency interference from another wireless communication technology co-resident in a Bluetooth product.

2. Background

The following documents are incorporated herein by reference: U.S. Pat. No. 7,035,314; and Specification of the Bluetooth System (v3.0+HS).

Bluetooth technology uses the 2.4 GHz Industrial, Scientific and Medical (ISM) band which is available worldwide. Other technologies use bands immediately above or below the 2.4 GHz band. These other technologies (e.g. LTE, WiMAX, 4G technologies) may be added into the same physical product as Bluetooth technology, so isolation may be needed to protect the Bluetooth receiver from interference caused by transmissions from the added technologies. Depending on relevant filter characteristics, some frequencies may not be usable for Bluetooth reception during intervals when the added technologies are transmitting. As a result, the incidence of Bluetooth paging or inquiry failures may become unacceptably high to the end user.

Some known solutions use priority signaling to disable the added technology transmitter(s) to prevent interference with operation of the Bluetooth receiver. However, Bluetooth page scanning requires a 1% duty cycle, and the corresponding disabling of the added technology could degrade that technology's throughput and, potentially, the throughput of an entire cell site. Other known solutions extend the timeout periods for Bluetooth paging and/or inquiry by up to 4 times the normal period.

It is desirable in view of the foregoing to provide for techniques that protect a Bluetooth receiver from interference caused by transmissions associated with added technologies, while avoiding disadvantages of known solutions.

SUMMARY

Exemplary embodiments of the present work identify one or more Bluetooth frequencies that are unusable for a Bluetooth introduction sequence due to operation of other wireless technology co-resident on a Bluetooth-capable device. One or more usable frequencies are then substituted for the one or more unusable frequencies to permit the introduction sequence to proceed. Some embodiments select the one or more usable frequencies from a known set of usable frequencies in the current Bluetooth frequency train. Some embodiments use a frequency re-mapping process to select the one or more usable frequencies from the current Bluetooth frequency train.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work. The word "exemplary" is used herein to mean "serving as an example, instance, or illustration." Any embodiment described herein as "exemplary" is not necessarily to be construed as preferred or advantageous over other embodiments.

As is well known in the art, Bluetooth technology uses a mechanism called inquiry for discovering neighboring devices. Inquiry uses a fixed frequency hopping pattern (containing 32 frequencies) that is derived from the clock of the inquiring Bluetooth device (the device performing inquiry), and the General Inquiry Access Code (GIAC). The inquiring device transmits two ID packets on two inquiry frequencies and then listens for a response on two inquiry response frequencies. The device performing inquiry scanning (the discoverable device) conversely listens for the ID packets on a frequency from the complete set of inquiry frequencies, and responds on an inquiry response frequency that corresponds to the inquiry frequency used for listening. The inquiry frequency and the inquiry response frequency used by the discoverable device are thus related as a frequency pair. The inquiry frequency and the inquiry response frequency of that frequency pair are also respectively referred to herein as the first and second frequencies of the pair.

Figure 1:
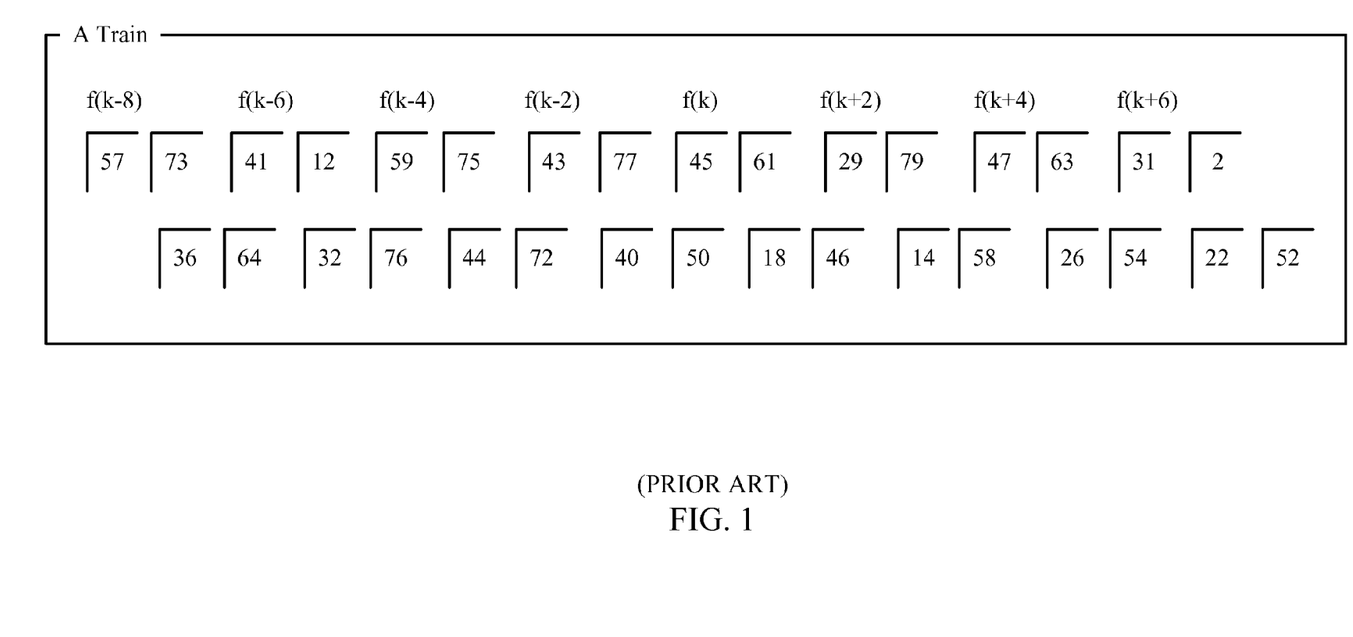
FIG. 1 illustrates frequency pairs for the A frequency train used by conventional Bluetooth devices.

FIG. 1 shows the frequency pairs for the A frequency train in Bluetooth technology. The frequency values are shown in an abbreviated format, the actual value in GHz being 2400 plus the value shown. Each frequency in the upper row is an inquiry frequency on which the discoverable device listens for the ID packets, i.e., the aforementioned first frequency. Each frequency in the lower row is an inquiry response frequency on which the discoverable device responds when it receives an ID packet, i.e., the aforementioned second frequency. The first frequencies (also referred to as Rx frequencies) and the second frequencies (also referred to as Tx frequencies) are paired, such that first frequency 2457 GHz is paired with second frequency 2436 GHz, first frequency 2473 GHz is paired with second frequency 2464 GHz, etc.

If some frequencies in the 2.4 GHz band are not usable due to interference from other resident wireless technologies, the inquiry process will become progressively less reliable as the number of unusable frequencies increases. For example, if all Rx frequencies (upper row in FIG. 1) above 2454 GHz are unusable, it can be seen from FIG. 1 that only eight of the 16 frequencies pairs in the A train would be usable pairs. This would result in frustrated users because many devices could not be successfully discovered by the inquiry process. The range of usable frequencies may impact the Tx and Rx frequencies differently, such that one frequency of a pair may be usable, while the other frequency is not. For example, all of the Tx frequencies may be usable, while some of the Rx frequencies are not.

Figure 2:
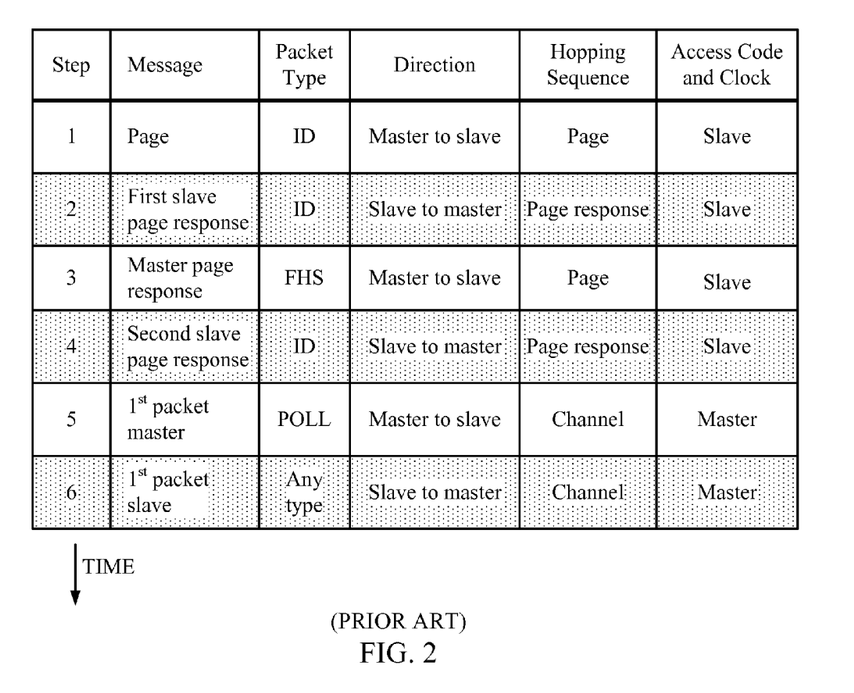
FIG. 2 illustrates steps of the conventional Bluetooth paging sequence.

Referring to FIG. 2, the conventional Bluetooth paging sequence (for connection set up) is similar to the Bluetooth inquiry sequence, except that, in addition to an initial listen and response introduction sub-sequence (shown as steps 1 and 2) executed by the page scanning device, the paging sequence includes a second listen and response sub-sequence (shown as steps 3 and 4) executed by the page scanning device. Also in paging, the frequency hopping pattern (containing 32 frequencies) is derived from the paging device's clock and the paged device's Bluetooth device address (BD_ADDR), and is thus fixed for each device based on its device address, rather than being the same for all devices as in inquiry. Like inquiry, paging would be significantly impaired by an unusable frequency pair circumstance such as described above with respect to FIG. 1. In particular, two usable frequency pairs are needed for successful completion of steps 1-4 in FIG. 2. The packet transmitted in step 3 of FIG. 2 is known as a Frequency Hopping Synchronization (FHS) packet.

Figure 3:
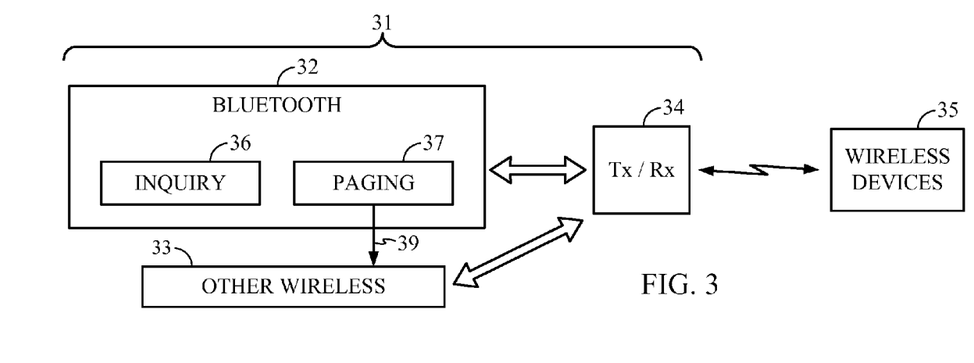
FIG. 3 diagrammatically illustrates a wireless communication system according to exemplary embodiments of the present work.

FIG. 3 diagrammatically illustrates a wireless communication system according to exemplary embodiments of the present work. The system of FIG. 3 includes a wireless communication device 31 having provided therein a Bluetooth portion 32 according to exemplary embodiments of the present work, and one or more other (e.g., LTE, or WiMax or other 4G) wireless technology portions shown generally at 33. The portions 32 and 33 are coupled to transceiver facilities shown generally at 34, for wireless communication with one or more other wireless communication devices shown generally at 35. The Bluetooth portion 32 of the device 31 includes an improved inquiry processing portion 36 and an improved paging processing portion 37. As described below, these processing portions 36 and 37 mitigate problems in circumstances such as described above where some frequencies are unusable.

In various embodiments, the device(s) indicated at 35 may variously include one or more further instances of the device 31, either fixed or mobile, one or more conventional Bluetooth capable devices, either fixed or mobile, and various combinations thereof. The device(s) at 35 may also include one or more (fixed or mobile) devices without Bluetooth capability, but capable of communication with one or more of the other wireless technology portions at 33.

Figure 4:
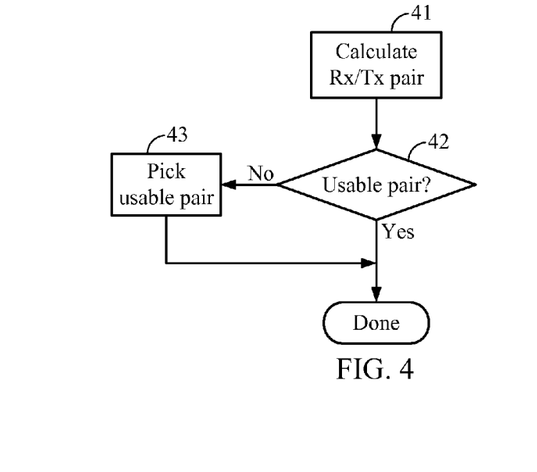
FIG. 4 illustrates operations that may be performed by the inquiry processing portion of FIG. 3 according to exemplary embodiments of the present work.

FIG. 4 illustrates operations that may be performed by the inquiry processing portion 36 when the device 31 executes inquiry scanning according to exemplary embodiments of the present work. At 41, the Rx/Tx frequency pair for inquiry is calculated in conventional fashion. It is then determined at 42 whether this pair is a usable pair under the present operating conditions of the device. The usable pairs are readily identified from known information about any other wireless technology portion(s) of the device that are currently operating. If the calculated frequency pair is determined to be usable at 42, then inquiry proceeds from 42 in conventional fashion. If the calculated frequency pair is not usable at 42, then a usable frequency pair from within the same frequency train is selected at 43, after which the inquiry sequence proceeds conventionally. Some embodiments randomly select the usable pair at 43 from among the usable pairs in the frequency train. Some embodiments select the next-in-time usable pair in the frequency train. Some embodiments purposely select a usable pair available later in the frequency train than the next-in-time usable pair.

Figure 5:
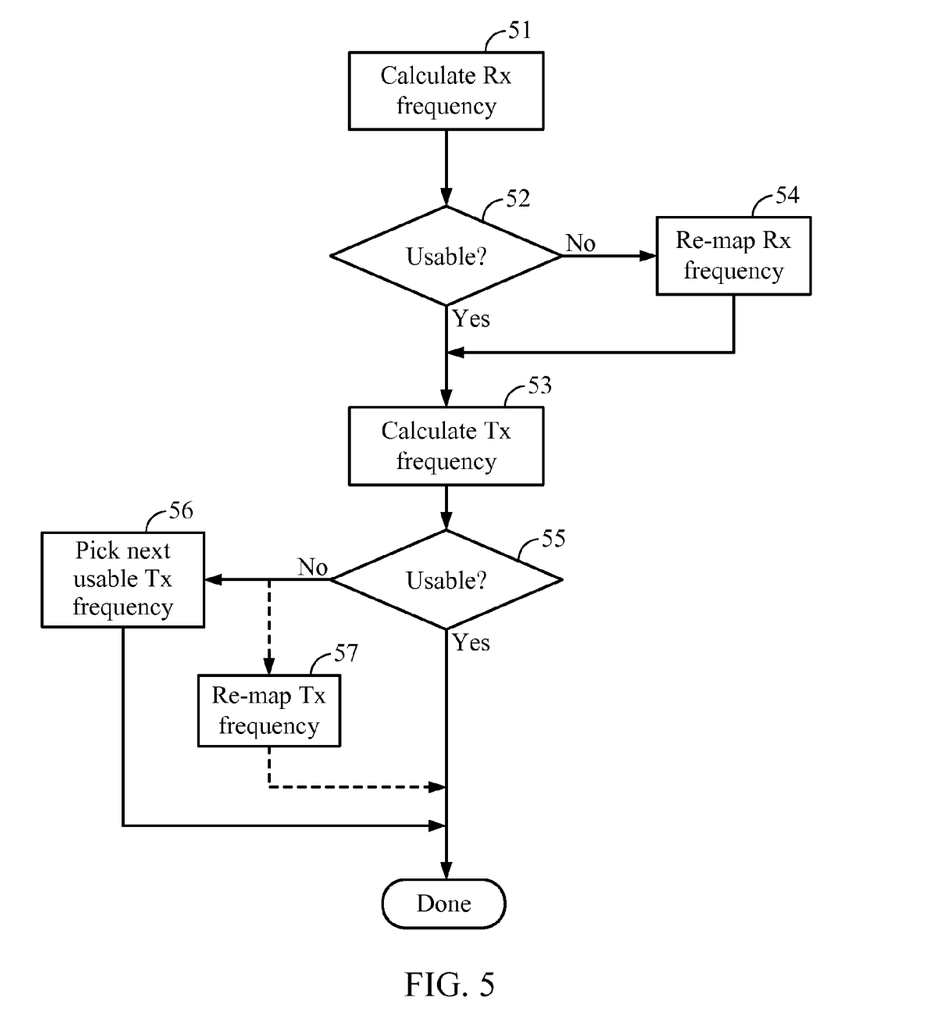
FIG. 5 illustrates operations that may be performed by the inquiry processing portion of FIG. 3 according to further exemplary embodiments of the present work.

FIG. 5 illustrates operations that may be performed by the inquiry processing portion 36 when the device 31 executes inquiry scanning according to further exemplary embodiments of the present work. At 51, the Rx frequency is calculated in conventional fashion. If the calculated Rx frequency is determined to be usable at 52, then the corresponding Tx frequency is determined at 53. If that Tx frequency is usable at 55, then inquiry proceeds in conventional fashion.

If the calculated Rx frequency is not usable at 52, then the Rx frequency is remapped to a usable frequency at 54 using, for example, techniques described below with respect to FIG. 6. Operations then proceed to 53.

If the Tx frequency is determined at 55 to be unusable, then the next usable Tx frequency is selected at 56 from the set of usable frequencies in the train, and is used together with the determined Rx frequency to proceed with inquiry.

In some embodiments (illustrated by broken line in FIG. 5), if the Tx frequency is unusable at 55, then the Tx frequency is remapped to a usable frequency at 57 using, for example, techniques described below with respect to FIG. 6. Inquiry then proceeds with the determined Rx and Tx frequencies.

Figure 6:
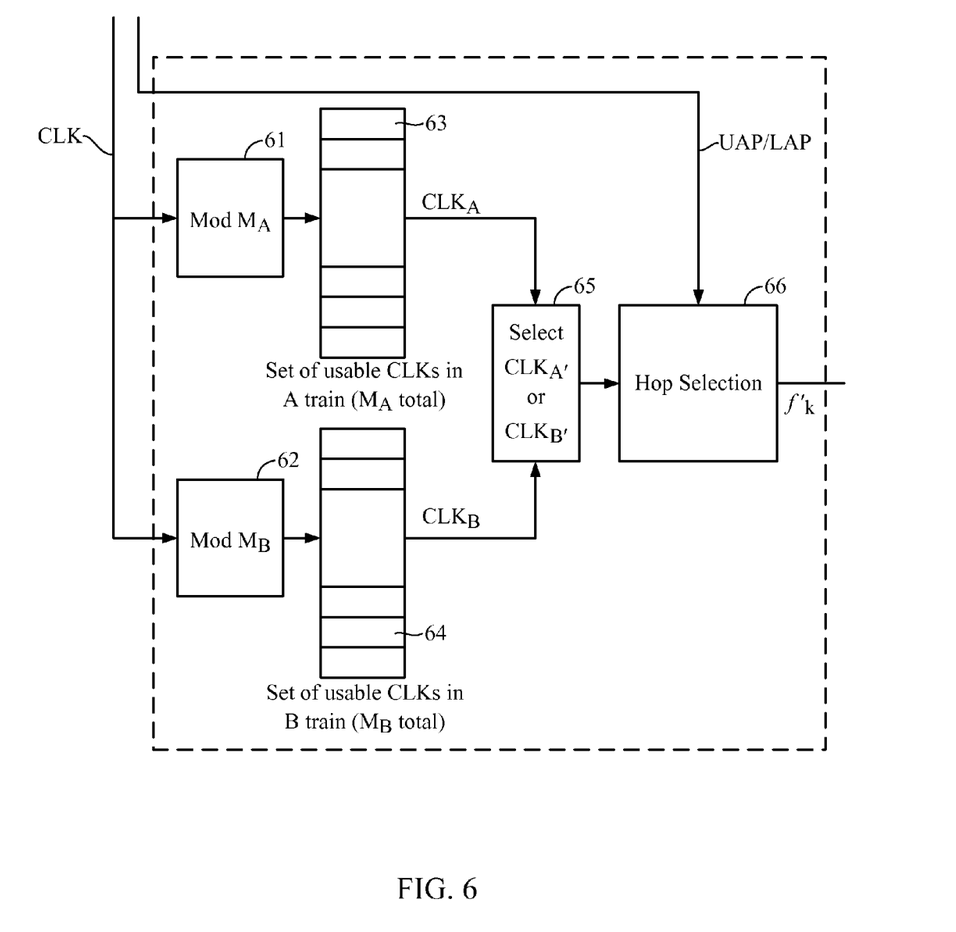
FIG. 6 diagrammatically illustrates a frequency hopping re-mapper according to exemplary embodiments of the present work.

FIG. 6 diagrammatically illustrates a frequency hopping re-mapper according to exemplary embodiments of the present work. In some embodiments, the inquiry and paging processing portions 36 and 37 of FIG. 3 include the re-mapper of FIG. 6. In some embodiments, the inquiry and page portions share the re-mapper. The Mod $M_A$ and Mod $M_B$ sections 61 and 62 translate the current digital value of the device's clock (CLK) signal into modulo $M_A$ and modulo $M_B$ values, respectively, where $M_A$ is the number of usable values of CLK for the A frequency train, and $M_B$ is the number of usable values of CLK for the B frequency train. The modulo $M_A$ value and the modulo $M_B$ value serve as pointers for indexing into respective look-up tables 63 and 64 of the known usable values of CLK for the A and B frequency trains, respectively. These usable values of CLK are readily determined from the known usable frequencies, due to the conventional relationship between the frequencies and the CLK values. Depending on which of the A and B frequency trains is currently in use, a usable CLK value, CLKA' or CLKB', obtained from the corresponding table is selected by a selector 65 for input to a conventional Bluetooth hop selector 66. The hop selector 66 operates in response to the selected one of CLKA' or CLKB' (instead of in response to CLK as it normally would), and thereby determines a re-mapped, usable frequency $f'_k$. The signal UAP/LAP is the conventional Bluetooth signal representing the upper and lower parts of the device address. (Recall Bluetooth page scan frequencies are based on CLK and the device address.)

Figure 7:
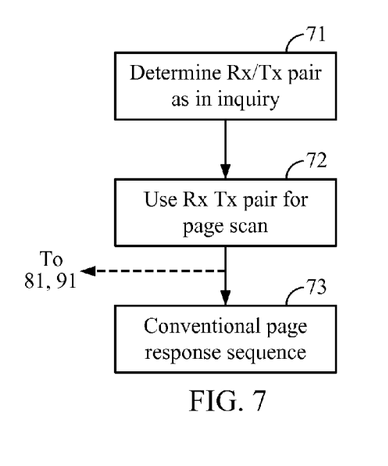
FIG. 7 illustrates operations that may be performed by the paging processing portion of FIG. 3 according to exemplary embodiments of the present work.

FIG. 7 illustrates operations that may be performed by the paging processing portion 37 when the device 31 executes paging according to exemplary embodiments of the present work. At 71, a usable Rx/Tx frequency pair for page scanning is determined, for example, as described above with respect to FIG. 4 or FIG. 5 for inquiry scan operation. The determined frequency pair is then used at 72 for page scan. Thereafter, the paging sequence (i.e., steps 3-6 in FIG. 2) continues in conventional fashion at 73.

As indicated above, it is generally known in the art to use priority signaling to disable resident interferers during Bluetooth activity. Exemplary embodiments of the present work provide novel uses of priority signaling as described below with respect to FIGS. 8 and 9.

Figure 8:
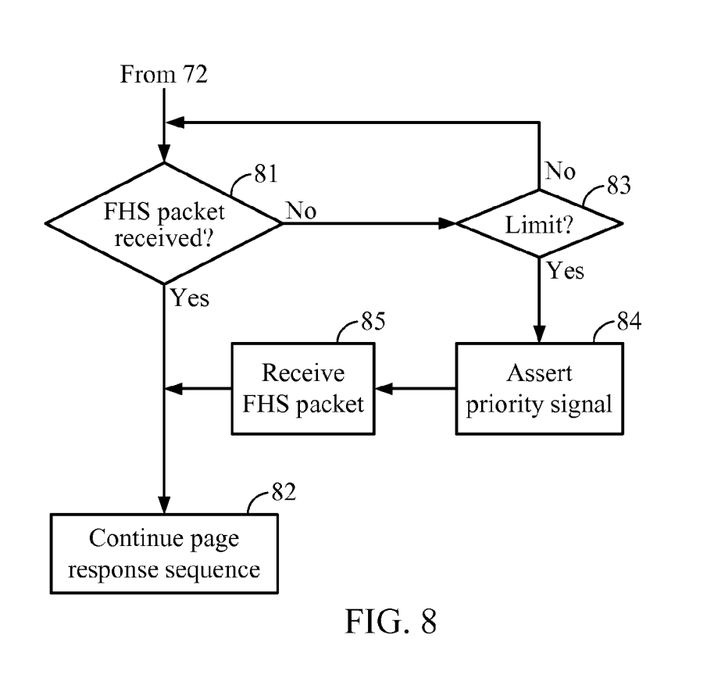
FIG. 8 illustrates operations that may be performed by the paging processing portion of FIG. 3 according to further exemplary embodiments of the present work.

FIG. 8 illustrates operations that may be performed by the paging processing portion 37 when the device 31 executes paging according to further exemplary embodiments of the present work. FIG. 8 shows that, after page scan is completed at 72 in FIG. 7, operations proceed to 81, where it is determined if the FHS packet is successfully received (see also step 3 in FIG. 2). If so, the paging response sequence continues (i.e., from step 4 in FIG. 2) in conventional fashion at 82. If the FHS packet has not been received at 81, it is determined at 83 whether an attempt limit has been reached. If not, then the next attempt to receive the FHS packet occurs at 81. If the attempt limit is reached at 83, that is, if one, two or three (in various embodiments) receive attempts are unsuccessful, then a priority signal (see also 39 in FIG. 3) is asserted at 84. The priority signal disables the known interferer, thereby permitting successful receipt of the FHS packet at 85, after which the paging sequence continues at 82.

Figure 9:
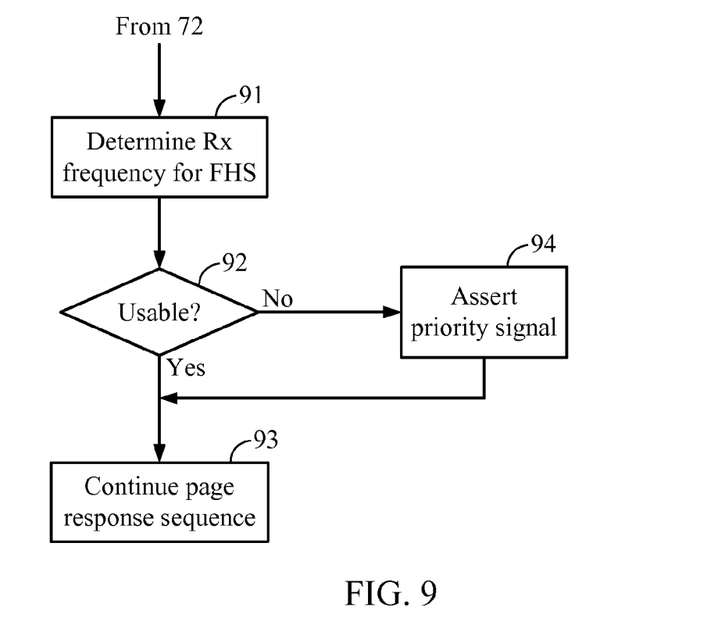
FIG. 9 illustrates operations that may be performed by the paging processing portion of FIG. 3 according to further exemplary embodiments of the present work.

FIG. 9 illustrates operations that may be performed by the paging processing portion 37 when the device 31 executes paging according to further exemplary embodiments of the present work. FIG. 9 shows that, after page scan is completed at 72 in FIG. 7, operations proceed to 91, where the Rx frequency for the FHS packet (see also FIG. 2) is determined in conventional fashion. It is then determined at 92 whether the Rx frequency is usable. If so, the paging sequence continues (i.e., from step 3 in FIG. 2) in conventional fashion at 93. If the Rx frequency is not usable at 92, then a priority signal (see also 39 in FIG. 3) is asserted at 94. The priority signal disables the known interferer, after which the paging sequence continues (from step 3 in FIG. 2) at 93.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method for a Bluetooth-capable device to replace frequencies that are unusable in a Bluetooth introduction sequence due to operation of another wireless technology in the device, comprising:

determining a frequency pair in a current frequency train, wherein the frequency pair consists of a listen frequency and a respond frequency;

determining whether the frequency pair is unusable for the introduction sequence; and in response to a determination that the frequency pair is unusable for the introduction sequence, selecting from the current frequency train another said frequency pair from among a set of said frequency pairs that are usable for the introduction sequence; wherein the introductory sequence is a Bluetooth inquiry or paging sequence.

2. The method of claim 1, wherein said selecting includes selecting said another frequency pair randomly from said set.

3. The method of claim 1, wherein said selecting includes selecting said another frequency pair to be a next said frequency pair of said set in the current frequency train.

4. The method of claim 1, wherein said selecting includes selecting said another frequency pair to be one of said frequency pairs of said set that temporally follows a next said frequency pair of said set in the current frequency train.

5. The method of claim 1, wherein the introduction sequence is part of a Bluetooth paging sequence.

6. The method of claim 5, including responding to an unsuccessful attempt to receive a Frequency Hopping Synchronization (FHS) packet in the Bluetooth paging sequence by disabling operation of said another wireless technology.

7. The method of claim 6, wherein said responding includes responding to repeated unsuccessful attempts to receive an FHS packet.

8. The method of claim 5, including, in response to a determination that a frequency on which an FHS packet is to be received in the Bluetooth paging sequence is unusable, disabling operation of said another wireless technology.

9. A method for a Bluetooth-capable device to replace frequencies that are unusable in a Bluetooth introduction sequence due to operation of another wireless technology in the device, comprising:
 determining from a current frequency train a frequency usable as one of a listen frequency and a respond frequency;
 determining whether a frequency from the current frequency train that corresponds to said usable frequency is usable as the other of said listen and respond frequencies; and
 in response to a determination that the corresponding frequency is unusable as said other frequency, selecting a frequency usable as said other frequency from a set of frequencies in the current frequency train that are usable as said other frequency; wherein the introductory sequence is a Bluetooth inquiry or paging sequence.

10. The method of claim 9, wherein said determining a frequency usable as said one frequency includes, in response to an initial selection of a frequency that is not usable as said one frequency, performing a frequency re-mapping process relative to the current frequency train to determine said frequency usable as said one frequency.

11. The method of claim 10, wherein said selecting includes performing a frequency re-mapping process relative to the current frequency train to determine said frequency usable as said other frequency.

12. The method of claim 10, wherein said selecting includes selecting a next frequency from the current frequency train that is a member of said set.

13. The method of claim 9, wherein said selecting includes performing a frequency re-mapping process relative to the current frequency train to determine said frequency usable as said other frequency.

14. The method of claim 9, wherein said selecting includes selecting a next frequency from the current frequency train that is a member of said set.

15. The method of claim 9, wherein the introduction sequence is part of a Bluetooth paging sequence.

16. The method of claim 15, including responding to an unsuccessful attempt to receive a Frequency Hopping Synchronization (FHS) packet in the Bluetooth paging sequence by disabling operation of said another wireless technology.

17. The method of claim 16, wherein said responding includes responding to repeated unsuccessful attempts to receive an FHS packet.

18. The method of claim 15, including, in response to a determination that a frequency on which an FHS packet is to be received in the Bluetooth paging sequence is unusable, disabling operation of said another wireless technology.

19. An apparatus for permitting a Bluetooth-capable device to replace frequencies that are unusable in a Bluetooth introduction sequence due to operation of another wireless technology in the device, comprising:
 means for determining a frequency pair in a current frequency train, wherein the frequency pair consists of a listen frequency and a respond frequency;
 means for determining whether the frequency pair is unusable for the introduction sequence; and
 means responsive to a determination that the frequency pair is unusable for the introduction sequence for selecting from the current frequency train another said frequency pair from among a set of said frequency pairs that are usable for the introduction sequence.

20. An apparatus for permitting a Bluetooth-capable device to replace frequencies that are unusable in a Bluetooth introduction sequence due to operation of another wireless technology in the device, comprising:
 means for determining from a current frequency train a frequency usable as one of a listen frequency and a respond frequency;
 means for determining whether a frequency from the current frequency train that corresponds to said usable frequency is usable as the other of said listen and respond frequencies; and
 means responsive to a determination that the corresponding frequency is unusable as said other frequency for selecting a frequency usable as said other frequency from a set of frequencies in the current frequency train that are usable as said other frequency.

21. A wireless communication apparatus, comprising:
 a Bluetooth portion;
 a further portion implementing wireless technology other than Bluetooth; and
 a wireless transceiver facility coupled to said Bluetooth portion and said further portion;
 wherein said Bluetooth portion includes a processor adapted to permit said Bluetooth portion to replace frequencies that are unusable in a Bluetooth introduction sequence due to operation of said further portion, said processor configured to determine a frequency pair in a current frequency train, wherein the frequency pair consists of a listen frequency and a respond frequency, said processor further configured to determine whether the frequency pair is unusable for the introduction sequence and, in response to a determination that the frequency pair is unusable for the introduction sequence, to select from the current frequency train another said frequency pair from among a set of said frequency pairs that are usable for the introduction sequence.

22. A wireless communication apparatus, comprising:
 a Bluetooth portion;
 a further portion implementing wireless technology other than Bluetooth; and
 a wireless transceiver facility coupled to said Bluetooth portion and said further portion;
 wherein said Bluetooth portion includes a processor adapted to permit said Bluetooth portion to replace frequencies that are unusable in a Bluetooth introduction sequence due to operation of said further portion, said processor configured to determine from a current frequency train a frequency usable as one of a listen frequency and a respond frequency, to determine whether a frequency from the current frequency train that corresponds to said usable frequency is usable as the other of said listen and respond frequencies and, in response to a determination that the corresponding frequency is unusable as said other frequency, to select a frequency usable as said other frequency from a set of frequencies in the current frequency train that are usable as said other frequency.

23. A non-transitory computer readable medium for permitting a Bluetooth-capable device to replace frequencies that are unusable in a Bluetooth introduction sequence due to operation of another wireless technology in the device, comprising:

a computer readable medium comprising:

code for causing at least one data processor to determine a frequency pair in a current frequency train, wherein the frequency pair consists of a listen frequency and a respond frequency; and code for causing the at least one data processor to determine whether the frequency pair is unusable for the introduction sequence and, in response to a determination that the frequency pair is unusable for the introduction sequence, to select from the current frequency train another said frequency pair from among a set of said frequency pairs that are usable for the introduction sequence.

24. A non-transitory computer readable medium for permitting a Bluetooth-capable device to replace frequencies that are unusable in a Bluetooth introduction sequence due to operation of another wireless technology in the device, comprising:

a computer readable medium comprising:

code for causing at least one data processor to determine from a current frequency train a frequency usable as one of a listen frequency and a respond frequency;

code for causing the at least one data processor to determine whether a frequency from the current frequency train that corresponds to said usable frequency is usable as the other of said listen and respond frequencies and, in response to a determination that the corresponding frequency is unusable as said other frequency, to select a frequency usable as said other frequency from a set of frequencies in the current frequency train that are usable as said other frequency.

* * * * *